United States Patent
Dubey et al.

(10) Patent No.: US 10,616,045 B2
(45) Date of Patent: Apr. 7, 2020

(54) MIGRATION OF CENTRALIZED ROUTING COMPONENTS OF LOGICAL ROUTER

(71) Applicant: Nicira, Inc., Palo Alto, CA (US)

(72) Inventors: Ankur Dubey, Santa Clara, CA (US); Abhishek Goliya, Pune (IN)

(73) Assignee: Nicira, Inc., Palo Alto, CA (US)

(*) Notice: Subject to any disclaimer, the term of this patent is extended or adjusted under 35 U.S.C. 154(b) by 121 days.

(21) Appl. No.: 15/451,372

(22) Filed: Mar. 6, 2017

(65) Prior Publication Data

US 2018/0183667 A1 Jun. 28, 2018

(30) Foreign Application Priority Data

Dec. 22, 2016 (IN) .............................. 201641043798

(51) Int. Cl.
*H04L 12/24* (2006.01)
*H04L 12/26* (2006.01)
*H04L 12/703* (2013.01)

(52) U.S. Cl.
CPC .......... *H04L 41/0663* (2013.01); *H04L 43/10* (2013.01); *H04L 45/28* (2013.01)

(58) Field of Classification Search
CPC ..................................................... H04L 45/28
See application file for complete search history.

(56) References Cited

U.S. PATENT DOCUMENTS

| 5,504,921 A | 4/1996 | Dev et al. |
| 5,550,816 A | 8/1996 | Hardwick et al. |
| 5,751,967 A | 5/1998 | Raab et al. |
| 6,006,275 A | 12/1999 | Picazo, Jr. et al. |
| 6,104,699 A | 8/2000 | Holender et al. |

(Continued)

FOREIGN PATENT DOCUMENTS

| CN | 101018159 A | 8/2007 |
| CN | 101981560 A | 2/2011 |

(Continued)

OTHER PUBLICATIONS

Non-Published Commonly Owned U.S. Appl. No. 15/146,339, filed May 4, 2016, 26 pages, Nicira, Inc.

(Continued)

*Primary Examiner* — Nicholas P Celani
(74) *Attorney, Agent, or Firm* — Adeli LLP

(57) ABSTRACT

Some embodiments provide a method for a controller that manages a physical network that implements multiple logical networks that include multiple logical routers. The method receives a command to change a particular centralized routing component of a logical router to an inactive state. At least two centralized routing components of the logical router are implemented on at least two different host machines in the physical network. The method identifies a host machine on which the particular centralized routing component operates. Other centralized routing components of other logical routers also operate on the identified host machine. The method sends a message to the identified host machine to cause the particular centralized routing component to change to an inactive state, without modifying a state of the identified host machine or the other centralized routing components operating on the identified host machine.

20 Claims, 6 Drawing Sheets

(56) References Cited

U.S. PATENT DOCUMENTS

| | | |
|---|---|---|
| 6,219,699 B1 | 4/2001 | McCloghrie et al. |
| 6,359,909 B1 | 3/2002 | Ito et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,680,934 B1 | 1/2004 | Cain |
| 6,754,220 B1 | 6/2004 | Lamberton et al. |
| 6,785,843 B1 | 8/2004 | McRae et al. |
| 6,941,487 B1 | 9/2005 | Balakrishnan et al. |
| 6,950,428 B1 | 9/2005 | Horst et al. |
| 6,963,585 B1 | 11/2005 | Le Pennec et al. |
| 6,999,454 B1 | 2/2006 | Crump |
| 7,046,630 B2 | 5/2006 | Abe et al. |
| 7,152,179 B1 | 12/2006 | Critchfield |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,260,648 B2 | 8/2007 | Tingley et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,428,220 B1 | 9/2008 | Caronni et al. |
| 7,450,498 B2 | 11/2008 | Golia et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,411 B2 | 1/2009 | Weinstein et al. |
| 7,519,734 B1 | 4/2009 | Dumitriu et al. |
| 7,555,002 B2 | 6/2009 | Arndt et al. |
| 7,606,260 B2 | 10/2009 | Oguchi et al. |
| 7,643,488 B2 | 1/2010 | Khanna et al. |
| 7,647,426 B2 | 1/2010 | Patel et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,014,278 B1 | 9/2011 | Subramanian et al. |
| 8,027,354 B1 | 9/2011 | Portolani et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,166,201 B2 | 4/2012 | Richardson et al. |
| 8,194,674 B1 | 6/2012 | Pagel et al. |
| 8,199,750 B1 | 6/2012 | Schultz et al. |
| 8,218,454 B2 | 7/2012 | Hajiaghayi et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,239,572 B1 | 8/2012 | Brandwine et al. |
| 8,259,571 B1 | 9/2012 | Raphel et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,650 B2 | 1/2013 | Foxworthy et al. |
| 8,351,418 B2 | 1/2013 | Zhao et al. |
| 8,370,834 B2 | 2/2013 | Edwards et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,627,313 B2 | 1/2014 | Edwards et al. |
| 8,644,188 B1 | 2/2014 | Brandwine et al. |
| 8,660,129 B1 | 2/2014 | Brendel et al. |
| 8,705,513 B2 | 4/2014 | Van Der Merwe et al. |
| 8,762,507 B1 | 6/2014 | Ingram et al. |
| 8,775,599 B2 | 7/2014 | Bansal et al. |
| 8,902,743 B2 | 12/2014 | Greenberg et al. |
| 8,904,028 B2 | 12/2014 | Lannaccone et al. |
| 8,958,298 B2 | 2/2015 | Zhang et al. |
| 8,997,094 B2 | 3/2015 | Bosch et al. |
| 9,059,999 B2 | 6/2015 | Koponen et al. |
| 9,201,837 B2 | 12/2015 | Egi et al. |
| 9,203,703 B2 | 12/2015 | Koponen et al. |
| 9,225,597 B2 | 12/2015 | Tubaltsev et al. |
| 9,270,581 B2 | 2/2016 | Guellal et al. |
| 9,450,852 B1 | 9/2016 | Chen et al. |
| 9,503,371 B2 | 11/2016 | Thakkar et al. |
| 9,577,845 B2 | 2/2017 | Thakkar et al. |
| 9,590,901 B2 | 3/2017 | Tubaltsev et al. |
| 9,762,537 B1 | 9/2017 | Eyada |
| 10,003,534 B2 | 6/2018 | Thakkar et al. |
| 10,038,628 B2 | 7/2018 | Ravinoothala et al. |
| 10,091,161 B2 | 10/2018 | Dubey et al. |
| 2001/0043614 A1 | 11/2001 | Viswanadham et al. |
| 2002/0093952 A1 | 7/2002 | Gonda |
| 2002/0095498 A1 | 7/2002 | Chanda et al. |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2003/0069972 A1 | 4/2003 | Yoshimura et al. |
| 2004/0073659 A1 | 4/2004 | Rajsic et al. |
| 2004/0098505 A1 | 5/2004 | Clemmensen |
| 2004/0267866 A1 | 12/2004 | Carollo et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0120160 A1 | 6/2005 | Plouffe et al. |
| 2005/0132044 A1 | 6/2005 | Guingo et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0029056 A1 | 2/2006 | Perera et al. |
| 2006/0056317 A1 | 3/2006 | Manning et al. |
| 2006/0056412 A1 | 3/2006 | Page |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0198321 A1 | 9/2006 | Nadeau et al. |
| 2006/0239271 A1 | 10/2006 | Khasnabish et al. |
| 2006/0291388 A1 | 12/2006 | Amdahl et al. |
| 2007/0028244 A1 | 2/2007 | Landis et al. |
| 2007/0043860 A1 | 2/2007 | Pabari |
| 2007/0064673 A1 | 3/2007 | Bhandaru et al. |
| 2007/0140128 A1 | 6/2007 | Klinker et al. |
| 2007/0140235 A1 | 6/2007 | Aysan et al. |
| 2007/0156919 A1 | 7/2007 | Potti et al. |
| 2007/0201357 A1 | 8/2007 | Smethurst et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0013474 A1 | 1/2008 | Nagarajan et al. |
| 2008/0031263 A1 | 2/2008 | Ervin et al. |
| 2008/0049621 A1 | 2/2008 | McGuire et al. |
| 2008/0049646 A1 | 2/2008 | Lu |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0151893 A1 | 6/2008 | Nordmark et al. |
| 2008/0159301 A1 | 7/2008 | De Heer |

(56) References Cited

U.S. PATENT DOCUMENTS

| | | |
|---|---|---|
| 2008/0189769 A1 | 8/2008 | Casado et al. |
| 2008/0198858 A1 | 8/2008 | Townsley et al. |
| 2008/0225853 A1 | 9/2008 | Melman et al. |
| 2008/0240122 A1 | 10/2008 | Richardson et al. |
| 2008/0253366 A1 | 10/2008 | Zuk et al. |
| 2008/0291910 A1 | 11/2008 | Tadimeti et al. |
| 2009/0016215 A1 | 1/2009 | Nadas et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249472 A1 | 10/2009 | Litvin et al. |
| 2009/0249473 A1 | 10/2009 | Cohn |
| 2009/0257440 A1 | 10/2009 | Yan et al. |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0046532 A1 | 2/2010 | Okita |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0149992 A1 | 6/2010 | Tan et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0241767 A1* | 9/2010 | Corry .................. G06F 3/0605 710/8 |
| 2010/0265956 A1 | 10/2010 | Li |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2010/0332664 A1 | 12/2010 | Yevmenkin et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0032843 A1 | 2/2011 | Papp et al. |
| 2011/0069634 A1 | 3/2011 | Hajiaghayi et al. |
| 2011/0075664 A1 | 3/2011 | Lambeth et al. |
| 2011/0075674 A1 | 3/2011 | Li et al. |
| 2011/0085557 A1 | 4/2011 | Gnanasekaram et al. |
| 2011/0085559 A1 | 4/2011 | Chung et al. |
| 2011/0119748 A1 | 5/2011 | Edwards et al. |
| 2011/0134931 A1 | 6/2011 | Merwe et al. |
| 2011/0142053 A1 | 6/2011 | Van Der Merwe et al. |
| 2011/0194567 A1 | 8/2011 | Shen |
| 2011/0261825 A1 | 10/2011 | Ichino |
| 2011/0283017 A1 | 11/2011 | Alkhatib et al. |
| 2011/0299386 A1* | 12/2011 | Negoto ................. H04L 45/22 370/221 |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0102009 A1 | 4/2012 | Peterson et al. |
| 2012/0131643 A1 | 5/2012 | Cheriton |
| 2012/0155266 A1 | 6/2012 | Patel et al. |
| 2012/0182992 A1 | 7/2012 | Cowart et al. |
| 2012/0182993 A1 | 7/2012 | Hadas et al. |
| 2012/0233331 A1 | 9/2012 | Voccio et al. |
| 2012/0236734 A1 | 9/2012 | Sampath et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0051399 A1 | 2/2013 | Zhang et al. |
| 2013/0083693 A1 | 4/2013 | Himura et al. |
| 2013/0121209 A1 | 5/2013 | Padmanabhan et al. |
| 2013/0125120 A1 | 5/2013 | Zhang et al. |
| 2013/0132536 A1 | 5/2013 | Zhang et al. |
| 2013/0142048 A1 | 6/2013 | Gross, IV et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0155845 A1 | 6/2013 | Patel et al. |
| 2013/0212246 A1 | 8/2013 | Koponen et al. |
| 2013/0219078 A1 | 8/2013 | Padmanabhan et al. |
| 2013/0250951 A1 | 9/2013 | Koganti |
| 2013/0254599 A1 | 9/2013 | Katkar et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0305344 A1 | 11/2013 | Alicherry et al. |
| 2013/0329548 A1 | 12/2013 | Nakil et al. |
| 2013/0329584 A1 | 12/2013 | Ghose et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0050218 A1 | 2/2014 | Kamble et al. |
| 2014/0056125 A1 | 2/2014 | Guellal et al. |
| 2014/0156818 A1 | 6/2014 | Hunt |
| 2014/0195666 A1 | 7/2014 | Dumitriu et al. |
| 2014/0201733 A1 | 7/2014 | Benny et al. |
| 2014/0229945 A1 | 8/2014 | Barkai et al. |
| 2014/0247753 A1 | 9/2014 | Koponen et al. |
| 2014/0269705 A1 | 9/2014 | DeCusatis et al. |
| 2014/0301391 A1 | 10/2014 | Krishnan et al. |
| 2014/0313892 A1 | 10/2014 | Kamble et al. |
| 2014/0341226 A1 | 11/2014 | Okita |
| 2014/0372582 A1 | 12/2014 | Ghanwani et al. |
| 2015/0009831 A1 | 1/2015 | Graf |
| 2015/0010009 A1 | 1/2015 | Takahashi et al. |
| 2015/0063360 A1* | 3/2015 | Thakkar ................ H04L 45/745 370/400 |
| 2015/0063364 A1 | 3/2015 | Thakkar et al. |
| 2015/0244628 A1 | 8/2015 | Gredler et al. |
| 2015/0263899 A1 | 9/2015 | Tubaltsev et al. |
| 2015/0263946 A1 | 9/2015 | Tubaltsev et al. |
| 2015/0271011 A1 | 9/2015 | Neginhal et al. |
| 2015/0309901 A1 | 10/2015 | Pershin et al. |
| 2015/0372943 A1 | 12/2015 | Hasan et al. |
| 2016/0080483 A1 | 3/2016 | Li et al. |
| 2016/0173415 A1 | 6/2016 | Wang et al. |
| 2016/0205196 A1 | 7/2016 | Hasan et al. |
| 2016/0248703 A1 | 8/2016 | Gopalakrishnan et al. |
| 2016/0294612 A1 | 10/2016 | Ravinoothala et al. |
| 2016/0301603 A1 | 10/2016 | Park et al. |
| 2017/0005915 A1 | 1/2017 | Mirsky et al. |
| 2017/0118067 A1 | 4/2017 | Vedula |
| 2017/0126493 A1 | 5/2017 | Zhang et al. |
| 2017/0139789 A1 | 5/2017 | Fries et al. |
| 2017/0142012 A1 | 5/2017 | Thakkar et al. |
| 2017/0163532 A1 | 6/2017 | Tubaltsev et al. |
| 2017/0288981 A1 | 10/2017 | Hong et al. |
| 2017/0317954 A1 | 11/2017 | Masurekar et al. |
| 2017/0317971 A1 | 11/2017 | Dubey et al. |
| 2018/0006880 A1 | 1/2018 | Shakimov et al. |
| 2018/0176073 A1 | 6/2018 | Dubey et al. |
| 2018/0183667 A1 | 6/2018 | Dubey et al. |
| 2018/0302326 A1 | 10/2018 | Thakkar et al. |
| 2018/0324088 A1 | 11/2018 | Ravinoothala et al. |

FOREIGN PATENT DOCUMENTS

| | | |
|---|---|---|
| CN | 102215158 A | 10/2011 |
| EP | 1653688 A1 | 5/2006 |
| EP | 2849395 A1 | 3/2015 |
| EP | 3117561 A2 | 1/2017 |

(56) References Cited

FOREIGN PATENT DOCUMENTS

| | | |
|---|---|---|
| GB | 2419703 A | 5/2006 |
| JP | 2003069609 A | 3/2003 |
| JP | 2003124976 A | 4/2003 |
| JP | 2003318949 A | 11/2003 |
| WO | 2005112390 A1 | 11/2005 |
| WO | 2008095010 A1 | 8/2008 |
| WO | 2008129527 A2 | 10/2008 |
| WO | 2013113265 A1 | 8/2013 |
| WO | 2015138043 A2 | 9/2015 |
| WO | 2015142404 A1 | 9/2015 |
| WO | 2016164277 A1 | 10/2016 |

OTHER PUBLICATIONS

Non-Published Commonly Owned U.S. Appl. No. 15/196,530, filed Jun. 29, 2016, 29 pages, Nicira, Inc.

Non-Published Commonly Owned U.S. Appl. No. 15/387,549, filed Dec. 21, 2016, 55 pages, Nicira, Inc.

Non-Published Commonly Owned U.S. Appl. No. 15/420,043, filed Jan. 30, 2017, 64 pages, Nicira, Inc.

Non-Published Commonly Owned U.S. Appl. No. 15/436,714, filed Feb. 2, 2017, 77 pages, Nicira, Inc.

Lin, Pingping, et al., "Seamless Interworking of SDN and IP," SIGCOMM '13, Aug. 12-16, 2013, 2 pages, ACM, New York, USA.

Mechtri, Marouen, et al., "Inter and Intra Cloud Networking Gateway as a Service," 2013 IEEE 2nd International Conference on Cloud Networking (ClouNet), Nov. 11, 2013, 8 pages, IEEE.

Caesar, Matthew, et al., "Design and Implementation of a Routing Control Platform," NSDI '05: 2nd Symposium on Networked Systems Design & Implementation , Apr. 2005, 14 pages, Usenix Association.

Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, 17 pages, ACM, New York, NY.

Dumitriu, Dan Mihai, et al., (U.S. Appl. No. 61/514,990), filed Aug. 4, 2011.

Koponen, Teemu, et al., "Network Virtualization in Multi-tenant Datacenters," Technical Report TR-2013-001E, Aug. 2013, 22 pages, VMware, Inc., Palo Alto, CA, USA.

Lakshminarayanan, Karthik, et al., "Routing as a Service," Report No. UCB/CSD-04-1327, Month Unknown 2004, 16 pages, Computer Science Division (EECS), University of California—Berkeley, Berkeley, California.

Maltz, David A., et al., "Routing Design in Operational Networks: A Look from the Inside," SIGCOMM '04, Aug. 30-Sep. 3, 2004, 14 pages, ACM, Portland, Oregon, USA.

Shenker, Scott, et al., "The Future of Networking, and the Past of Protocols," Dec. 2, 2011, 30 pages, USA.

Wang, Anjing, et al., "Network Virtualization: Technologies, Perspectives, and Frontiers," Journal of Lightwave Technology, Feb. 15, 2013, 15 pages, IEEE.

* cited by examiner

MIGRATION OF CENTRALIZED ROUTING COMPONENTS OF LOGICAL ROUTER

BACKGROUND

Within certain managed virtualized (logical) networks, logical routers may have centralized components implemented on certain host machines (also called edge nodes). These edge nodes can implement the centralized components for multiple logical routers at once. As such, taking down a single edge node, even temporarily, may affect numerous logical routers that are part of logical networks (possibly belonging to different tenants). As such, techniques for individually managing a centralized routing component implemented on an edge node without affecting the other routing components on the edge node are needed.

BRIEF SUMMARY

Some embodiments provide a method for enabling an administrator to force failover of a particular centralized routing component of a logical router, without affecting other centralized routing components (e.g., of other logical routers) that may operate on the same host machine as the particular centralized routing component. As an example, if an administrator wants to migrate the particular centralized routing component from a first host machine to a second host machine, this process may be used in some embodiments to do so without affecting the other centralized routing components on the first host machine and with minimal packet and connectivity loss for the logical router.

When the network administrator wants to migrate a particular centralized routing component, the administrator provides a command to the network controller or manager (e.g., a cluster of such managers) of some embodiments that manages the logical router and/or the physical host machines on which the centralized routing components of the logical router operate. This command may indicate the particular routing component and a target host machine for the migration (i.e., the host machine to which the particular routing component will be migrated) in some embodiments. In other cases, the administrator may force failover of the particular centralized routing component for another reason. For example, if the particular routing component is currently the active routing component and a second routing component is the standby routing component, forcing failover of the particular routing component will cause the particular routing component to become the standby routing component and, subsequently, the second routing component to become the active routing component.

One option for the network controller/manager (referred to henceforth as the network controller) is to temporarily take down the physical host machine on which the particular routing component operates. This would cause the host machine to notify its peers that it is down (or for those peers to no longer detect that the host machine is operating), and the peer on which the second routing component operates would cause the second routing component to become the active routing component. However, doing so will negatively affect the other logical routers that have components on the host machine, which may host centralized routing components for other logical routers as well.

Thus, the network controller sends a message to the physical host machine on which the particular centralized routing component operates that causes the particular routing component to operate as a standby routing component rather than active routing component for the logical router. This also causes the host machine to send a message to any other host machines that host other logical routing components for the logical router, notifying them that the particular routing component has changed to an inactive state. In many cases, if the centralized routing components of the logical router operate in an active-standby configuration, there will be two centralized routing components. However, in other embodiments, additional standby routing components may be instantiated on different host machines.

The message sent from one host machine to another is a bidirectional forwarding detection (BFD) message in some embodiments. In some embodiments, the host machines use BFD sessions in a full mesh to maintain each others' connectivity status. In addition, BFD messages (i.e., heartbeat messages sent to indicate that connectivity is still available) may contain a field for diagnostic codes. Some embodiments overload the diagnostic code field to transmit information about the active or inactive state of the routing component(s) operating on the machine. Thus, if a routing component switches from active to inactive (or vice versa), this information is sent via BFD messages to other host machines on which routing components of the same logical router operate.

The subsequent behavior of these other routing components depends on several factors, in some embodiments. Specifically, in some embodiments the subsequent behavior depends on whether the routing component that changes to inactive state is designated as a primary or secondary routing component for the logical router, and whether the cluster for the logical router operates in preemptive or non-preemptive mode. When the logical router cluster operates in preemptive mode, the primary centralized routing component will always be the active routing component when it is in an active state, and the secondary centralized routing component will be the standby routing component whenever the primary routing component is active. On the other hand, in non-preemptive mode, the current active routing component will stay as such until that routing component goes down and the other takes over. In this case, the primary and secondary designation is only used when both routing components are currently designated as the active routing component—in this case, the secondary routing component automatically reverts to being the standby routing component for the logical router. In some embodiments, whether in preemptive or non-preemptive mode, each centralized routing component keeps track of a state machine (or the host machine on which it operates keeps track of this state machine for the routing component). The state machine, which differs slightly between preemptive and non-preemptive mode, specifies when to change between active, standby, or down (not operating) states based on the current state of the routing component and the active/inactive state of each of the other routing components.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for enabling an administrator to force failover of a particular centralized routing component of a logical router, without affecting other centralized routing components (e.g., of other logical routers) that may operate on the same host machine as the particular centralized routing component. As an example, if an administrator wants to migrate the particular centralized routing component from a first host machine to a second host machine, this process may be used in some embodiments to do so without affecting the other centralized routing components on the first host machine and with minimal packet and connectivity loss for the logical router.

Figure 1:
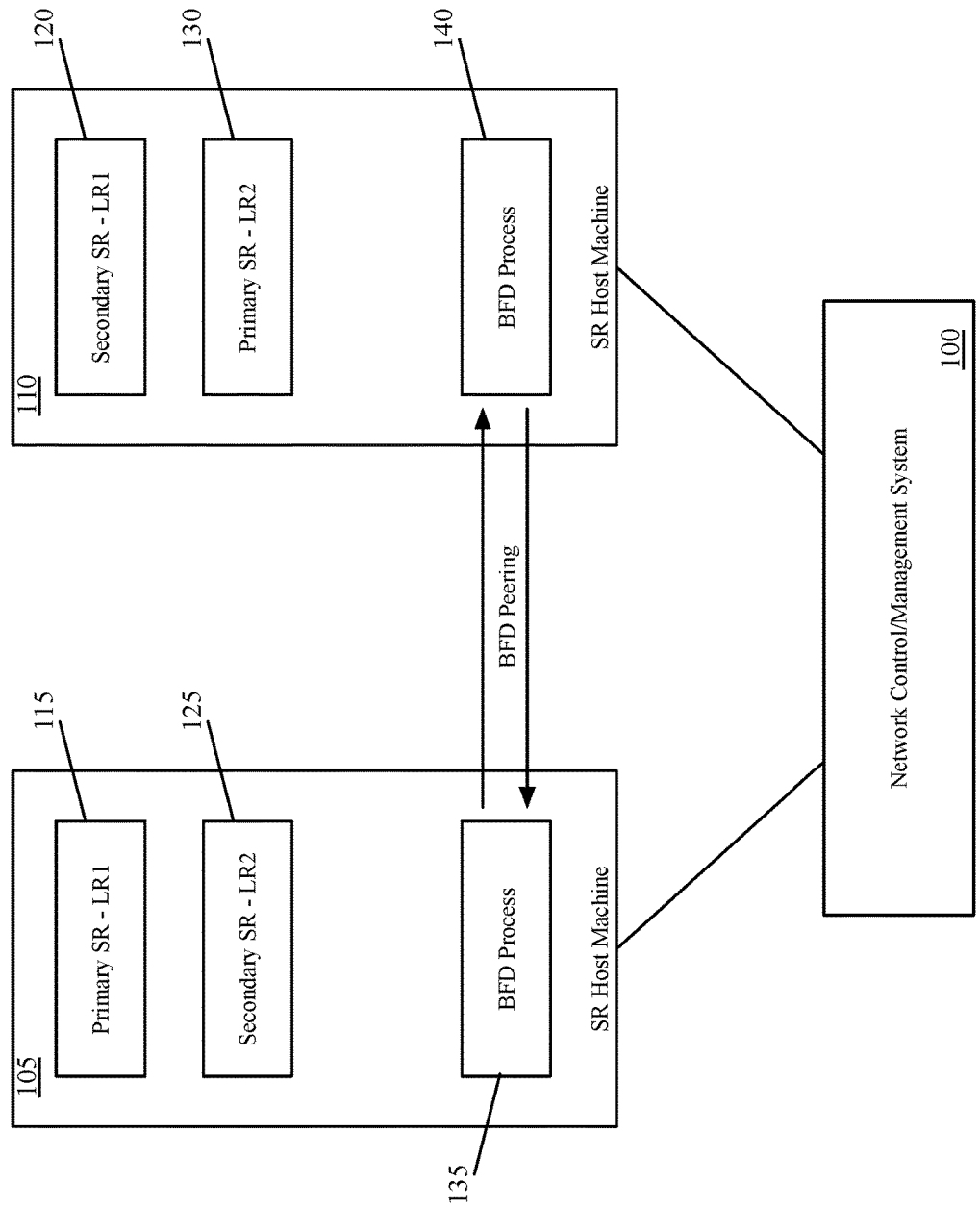
FIG. 1 conceptually illustrates two host machines that host centralized routing components.

FIG. 1 conceptually illustrates two host machines 105 and 110 that host centralized routing components (also referred to herein as service routers, or SRs). These SRs are routing components of logical routers defined for a logical network; the logical routers of some embodiments may include multiple routing components. Specifically, in some embodiments, when a user (e.g., a network administrator of a logical network) defines the logical network to include a logical router, the network management and control system that is responsible for translating the user definition of a logical network into an implementation in the physical network (e.g., datacenter network) defines multiple separate routing components for the logical router. For logical routers that either (i) provide stateful or otherwise centralized services (e.g., network address translation, stateful firewall, etc.) or (ii) provide a connection for the logical network to external networks (e.g., for traffic between remote clients and the logical network), some embodiments define a distributed routing component (a distributed router, or DR) and one or more centralized routing components.

While in some cases the SRs of a logical router may be configured in an active-active setup in which all of the SRs are actively processing traffic at the same time (e.g., when the SRs are primarily acting as a connection between the logical network and the external networks), in other cases the SRs are configured in an active-standby setup. In the active-standby configuration, only one of the SRs should be designated as the active SR at a given time, with the other (or all of the others, if more than two) designated as the standby SR.

In some embodiments, logical networks implemented within a datacenter may have multiple tiers of logical routers. For instance, some embodiments include tier-0 logical routers (also referred to as provider logical routers) that provide a connection for multiple tenant logical networks to the external networks and tier-1 logical routers (also referred to as tenant logical routers) that each connect a specific datacenter tenant logical network to the tier-0 logical router. In addition, the tier-1 logical routers may provide centralized stateful services, and are often configured in an active-standby configuration for this reason.

As noted, FIG. 1 illustrates two host machines 105 and 110. Both of these host machines host multiple SRs for different logical routers. Specifically, the first host machine 105 hosts a primary SR 115 for a first logical router LR1 and a secondary SR 120 for a second logical router LR2, while the second host machine 110 hosts a secondary SR 125 for the first logical router LR1 and a secondary SR 130 for the second logical router LR2. The primary/secondary distinction, which will be described in greater detail below, relates to the determination as to which of the SRs for a particular logical router will be the active SR and which will be the standby SR. In general, the primary SR is initially designated as the active SR and the secondary SR is initially designated as the standby SR. In the case of more than two SRs in an active-standby configuration, some embodiments rank the SRs, with the highest ranked (primary SR) initially designated as the active SR and all others initially designated as the standby SR.

Different embodiments may implement the SRs differently on the host machines. In some embodiments, each SR is a separate virtual machine (VM) operating on its host, and a separate managed forwarding element on the host machine forwards data packets to the VM for processing. In other embodiments, however, the SRs are incorporated into the datapath of the managed forwarding element on the host machine. In addition, in some embodiments, only one tier-0 SR may be implemented on a particular host machine, with numerous tier-1 SRs.

In addition, each of the host machines 105 and 110 runs a bidirectional forwarding detection (BFD) process 135 and 140. BFD is a protocol used to establish a session between two forwarding elements (in this case, the managed forwarding element implemented on the host machines, which in some embodiments also implements the SRs) and verify that the connection between the forwarding elements is available. In some embodiments, BFD hello packets are exchanged between the two host machines 105 and 110 (and any other host machines with which either of these hosts are peered) on a regular basis to verify that connectivity is still available between the hosts. The BFD processes 135 and 140 may operate in the respective virtualization software (e.g., hypervisor) of the host machines 105 and 110, in separate VMs or containers, etc.

This figure also illustrates a network management and control system 100 (referred to herein as a network control system). In some embodiments, the network control system 100 includes a cluster of network controllers that provide configuration data and other management commands to the host machines 105 and 110 and their SRs. In some embodiments, the network control system 100 includes a management plane layer and a central control plane layer. Each of these layers may be implemented by a separate physical machine or cluster, or the two layers may operate on the same physical machine or set of physical machines. In other embodiments, a single controller or cluster of controllers performs the operations of both the management plane and central control plane described below.

The management plane of some embodiments provides application programming interfaces (APIs) through which administrators (e.g., via a cloud management application) enter configuration data to configure one or more logical networks to be implemented within the physical network (e.g., a datacenter or datacenters) managed by the network control system 100. The logical network configuration from the administrator may include a network of logical L2 switches and logical L3 routers (with the logical router possibly including connections to other logical routers and/or subnets external to the logical network (e.g., in order to connect to the Internet)). The logical network configuration data may also include network address translation (NAT) rules, load balancing rules, rules for sending packets to third-party services, network security rules (e.g., DFW rules), etc.

The management plane of some embodiments converts the logical network configuration into rules defining logical forwarding elements (e.g., logical switches and routers), logical ports for the logical forwarding elements, security and encryption rules for the logical ports, etc. The central control plane of some embodiments handles the distribution of these rules to the appropriate MFEs. In some embodiments, the central control plane keeps track of the location in the physical network of each logical port. Upon receiving a rule for a particular logical port and/or logical forwarding element, the central control plane identifies the span for that rule (i.e., the managed forwarding elements that need to receive the rule in order to properly implement the logical network) and distributes the rule to local controllers that directly interact with the forwarding elements on their respective host machines. Though not shown, the SR host machines 105 and 110 may also include such local controllers, which receive configuration data from the central controllers and convert this data to an appropriate format to implement their respective SRs.

When the network administrator wants to migrate a particular centralized routing component, the administrator provides a command to the network controller or manager (e.g., a cluster of such managers) of some embodiments that manages the logical router and/or the physical host machines on which the centralized routing components of the logical router operate. This command may indicate the particular routing component and a target host machine for the migration (i.e., the host machine to which the particular routing component will be migrated) in some embodiments. In other cases, the administrator may force failover of the particular centralized routing component for another reason. For example, if the particular routing component is currently the active routing component and a second routing component is the standby routing component, forcing failover of the particular routing component will cause the particular routing component to become the standby routing component and, subsequently, the second routing component to become the active routing component. Whereas a typical failover causes traffic loss for a configured dead time interval (until the system determines that the active SR has failed and the previous standby becomes active) as well as a minimal recovery cost (e.g., while the new active SR sends out gratuitous ARP (GARP) packets to the managed forwarding elements implementing the DR of its logical router to indicate that it should receive traffic going forward), forced failover from the administrator limits this downtime to just the minimal recovery cost.

Figure 2:
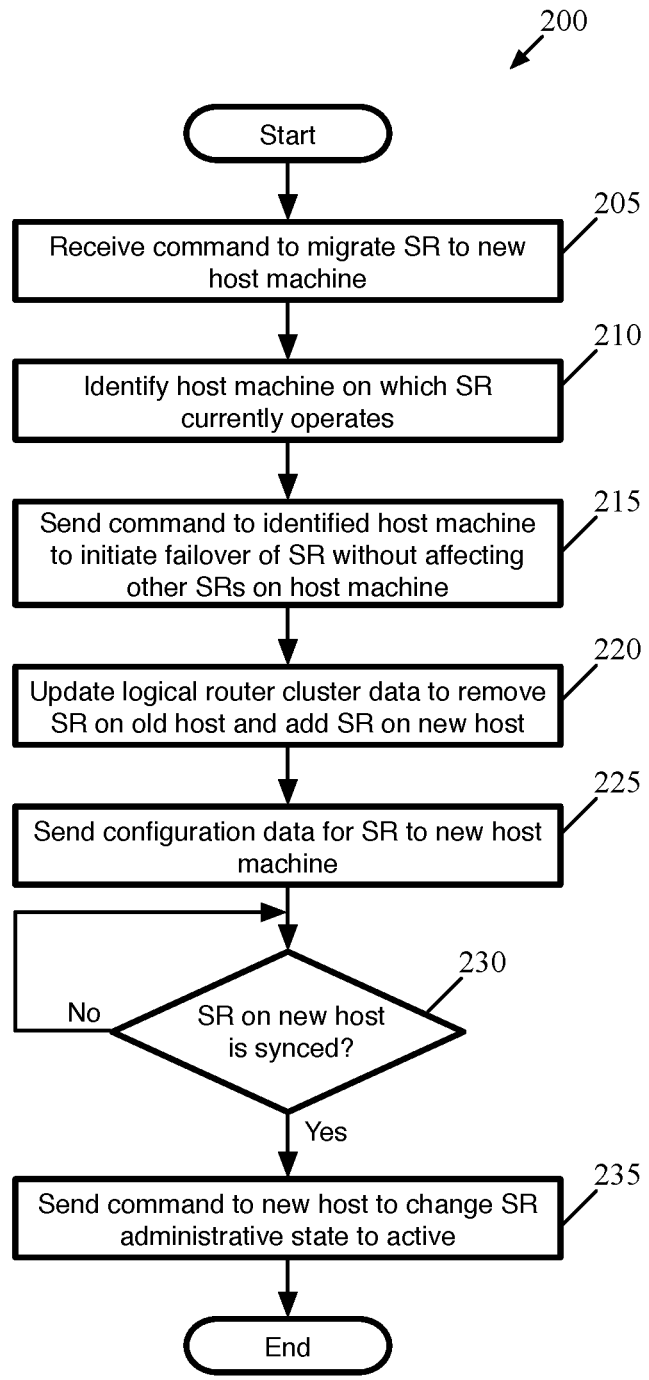
FIG. 2 conceptually illustrates a process of some embodiments for migrating an SR from a first host machine to a new second host machine.

FIG. 2 conceptually illustrates a process 200 of some embodiments for migrating an SR from a first host machine to a new second host machine. In some embodiments, the process 200 is performed by a management plane of a network control system, or by a combination of the management plane and central control plane. In addition, although this process is described in terms of migrating a SR, it should be understood that some of the same (or similar) operations may be performed in order to force failover of an active SR for other reasons, in some embodiments.

As shown, the process 200 begins by receiving (at 205) a command to migrate an SR to a new host machine. In some embodiments, the management plane receives this command from a network administrator via an API. The administrator might use a cloud management application UI to indicate that the SR should be migrated to a different host machine because, e.g., the allocation of SRs between various host machines in a cluster is not optimal. In some embodiments, even when the SR to be migrated is a tier-1 logical router (tenant logical router), the datacenter provider administrator may specify for an SR to be migrated if the administrator determines that the allocation of SRs is sub-optimal (e.g., too many SRs are operating on the current host machine with fewer SRs on a different host machine). In some cases, the command specifies a specific new host machine to which to migrate the SR, while in other cases the management plane selects the new host machine using various factors (e.g., balancing the load of SRs across the host machines in a cluster).

The process 200 then identifies (at 210) the host machine on which the SR currently operates, and sends (at 215) a command to the identified host machine to initiate failover of the SR. In some embodiments, the migration command received via the API at operation 205 specifies the host machine on which the SR operates, and thus operation 210 is not required. In other embodiments, this migration command only specifies the SR (and possibly a destination host machine), in which case the network control system maps the SR to the host machine on which it currently resides, based on its stored data indicating the locations of the various SRs within the managed physical network.

The command sent to initiate failover of the SR, in some embodiments, modifies the administrative state of the SR from active to inactive. In some embodiments, the administrative state of an SR is different than its internal active-standby state. That is, the administrative state for an SR may be active (operating, either as an active SR or a standby SR) or inactive/down (not operating, or should not be treated as operating, and therefore will not be the active SR in an active-standby pair). The internal active-standby state of an SR is determined based on a set of rules (a state machine) that determines whether an SR is active, standby, or down according to its previous state, its administrative state, and the active-standby state and administrative state of its peer (or peers).

One option for the network control system is to temporarily take down the physical host machine on which the particular routing component operates (e.g., the host machine 105 or 110). This would cause the host machine to notify its peers that it is down (or for those peers to no longer detect that the host machine is operating), and the peer of the SR being migrated would become the active SR if it was not already. However, doing so will negatively affect the other logical routers that have SRs on the same host machine.

Thus, in some embodiments the management plane sends a message to the identified host machine to change the administrative state of the SR to inactive, as doing so does not affect the other SRs operating on the identified host machine. This also causes the host machine to send a message to any other host machines that host the peer SRs of the same logical router, notifying them that the SR has changed to an inactive administrative state. As described below by reference to FIGS. 3-5, this has additional effects on the active-standby state of the peer SRs.

The above-described operations 210 and 215 may be performed for any type of forced failover event. In the case of migrating an SR, the network control system performs additional operations, as shown in FIG. 2. The process 200 next updates (at 220) stored logical router cluster data to remove the SR on the old host and add an SR (with the same configuration) on the new host. In some embodiments, the management plane stores data describing the logical network (e.g., as sets of data tuples). For the SRs, this data includes the mapping of each SR to a physical host machine.

The process 200 then sends (at 225) configuration data for the SR to the new host machine (i.e., the host machine to which the SR is being migrated). In some embodiments, the central controller (which may be physically and/or logically separate from the management plane) sends this configuration data to the new host machine based on the update to the logical router cluster at operation 220. That is, in some embodiments, operation 225 is actually a separate process from process 200, performed in response to operation 220. The central controller, in some embodiments, sends the configuration data to a local controller on the new host machine, which in turn configures the managed forwarding element and/or VM implementing the SR on that host machine.

Next, the process determines (at 230) whether the SR has completed its initial synchronization on the new host machine. This initial synchronization, in some embodiments, is completed once the host machine (e.g., the local controller on the host machine) notifies the management plane (either directly, or via the central controller) that the SR configuration has been received and the SR properly configured on the host machine. If the SR has not completed its initial sync, the process returns to 230. It should be understood that, in some embodiments, the process actually enters a "wait" state until an event (e.g., a message from the host machine) triggers the process to continue, rather than repeatedly checking whether the SR is synced on the new host.

Once the SR has completed its initial synchronization on the new host machine, the process sends (at 235) a command to the new host machine to change the administrative state of the SR to active. As with the operation 215, sending this message may cause internal state transitions for the SR (e.g., from standby to active), and may cause the host machine to notify other host machines that host peers of the SR of the administrative state change. As mentioned, these state changes will be discussed below.

Figure 3:
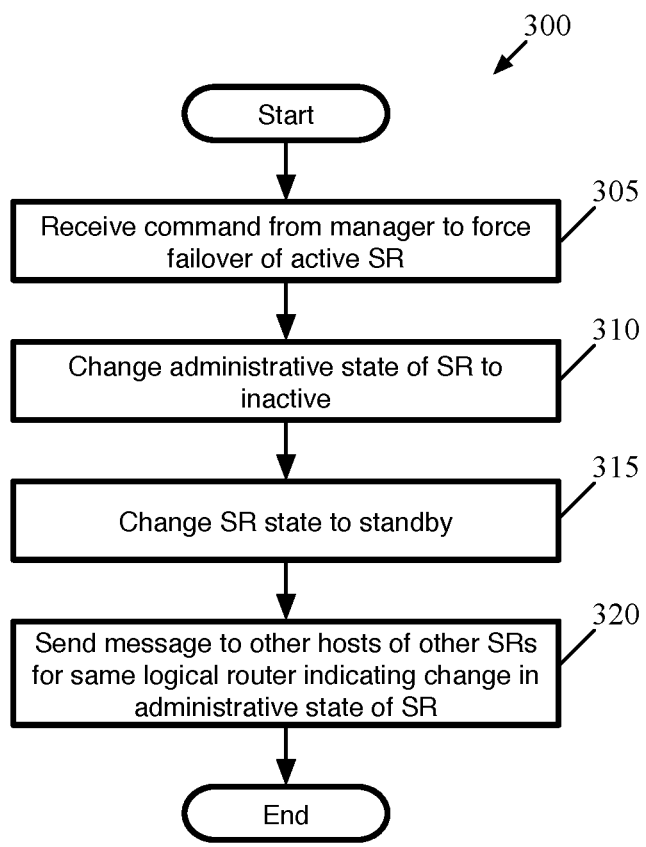
FIG. 3 conceptually illustrates a process 300 of some embodiments for modifying an active SR in response to such a failover command.

As mentioned, when the network control system (e.g., the management plane) sends a command to change the administrative state of a particular SR of a logical router, this can cause the active-standby configuration of the peered SRs for that logical router. FIG. 3 conceptually illustrates a process 300 of some embodiments for modifying an active SR in response to such a failover command. The process 300 is performed in some embodiments by the host machine on which the SR operates (e.g., by the local controller for that host machine).

As shown, the process 300 begins by receiving (at 305) a command to force the failover of an active SR. Specifically, in some embodiments, the management plane sends a command to the local controller or other entity on the host machine specifying to change the administrative state to inactive. In some embodiments, each SR has an administrative state, which is either active or inactive (also referred to as up or down), and may be set by administrative components of the network control system. In addition, each SR has an internal state, which in some embodiments is maintained by the local controller that directly manages the SR according to a set of rules (a state machine). Two different such state machines (for preemptive and non-preemptive configurations) will be described below by reference to FIGS. 4 and 5.

In response to the command, the process 300 changes (at 310) the administrative state of the SR to inactive. The process also changes (at 315) the active-standby (internal) state of the SR to standby (assuming that the SR was previously in the active state). Irrespective of whether the logical router cluster is configured in preemptive or non-preemptive mode, when the administrative state of an SR changes from active to inactive, its internal state will be modified to standby.

The process 300 also sends (at 320) a message (or messages) to other hosts with other SRs for the same logical router, to indicate the change in the administrative state of this SR. As mentioned, in some embodiments this message is sent using a diagnostic code field in a BFD packet. In some embodiments, any two host machines that are connected by a tunnel (e.g., because they may potentially need to send data traffic, they are part of the same cluster of SR hosts, etc.) establish a BFD session in order to ensure connectivity. BFD messages (i.e., heartbeat messages sent to indicate that connectivity is still available) may contain a field (e.g., a five-bit field) for diagnostic codes. Some embodiments overload the diagnostic code field to transmit information about the active or inactive state of the SR(s) operating on the machine.

Specifically, for a primary SR, some embodiments send messages using the diagnostic codes for three situations: (i) when the host health is not okay, (ii) when the administrative state of the SR changes to inactive, and (iii) when the administrative state of the SR has changed back to active. For a secondary SR, some embodiments send two messages using the diagnostic codes: (i) that the secondary SR has an internal state of active (which will have a different effect in preemptive and non-preemptive modes) and (ii) that the secondary SR has an internal state of either inactive or down, which would cause the primary SR to become active even in a non-preemptive configuration. In addition, some embodiments enable different behavior for tier-0 and tier-1 SRs, and use additional diagnostic codes to differentiate between the two.

Figure 4:
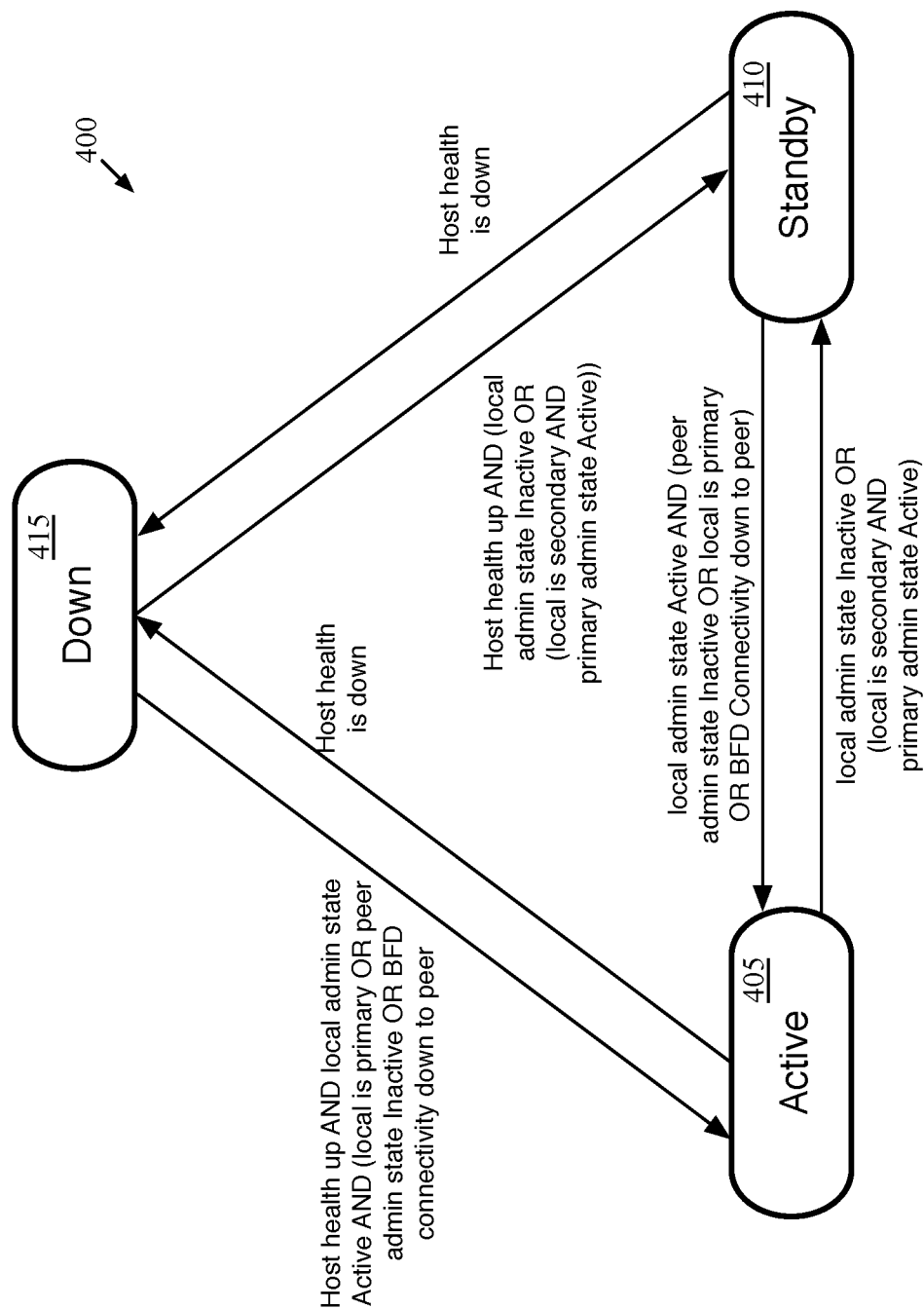
FIG. 4 conceptually illustrates a state machine for an SR in preemptive mode.

As mentioned, the internal (active-standby) state of a particular SR depends on several factors in some embodiments: (i) the previous internal state of the SR and its peer(s), the administrative state of the SR and its peer(s), whether the SR is primary or secondary, and whether the SR and its peer(s) are configured in preemptive and non-preemptive mode. FIG. 4 conceptually illustrates the state machine 400 for a SR in preemptive mode. In the preemptive mode of some embodiments, the primary SR will always be the active SR so long as its host machine is operating correctly (i.e., connectivity is fully available) and its administrative state is active. The secondary SR takes over as the active SR when an issue arises with the primary SR, but only for as long as that issue persists.

The preemptive mode state machine 400 of some embodiments has three possible states 405-415. In some embodiments, the local controller of the physical machine on which the SR operates manages the state machine to determine the SR state, while in other embodiments the SR itself manages the state machine to determine its own state. The three possible states are active 405 (the SR is the active member of the logical router cluster that handles traffic to and from the logical network and performs centralized stateful services), standby 410 (the SR is functioning as a backup, but is not currently advertising itself as the appropriate recipient of traffic), and down 415 (the SR is not able to receive traffic at all, typically due to a problem with its host machine).

As shown in the diagram, an SR will transition to the down state 415 from either the active state 405 or the standby state 410 whenever its host machine's health is down. This could be due to connectivity issues, host maintenance, an inability to communicate with the central controller and/or management plane (and therefore an inability to receive updates), etc.

An SR can transition from the down state 415 directly to the active state 405 when a number of conditions are met. First, the host machine's health must be back up. In addition, its administrative state must be active. If these first two conditions are met, then the SR will transition to the active state 405 if (i) it is designated as the primary SR in its logical router cluster, (ii) the administrative state of its peer is inactive, or (iii) BFD connectivity is unavailable with its peer. In preemptive mode, so long as the primary SR meets the first two conditions (host health and administrative state active), it will always move to the active internal state 405 (thereby prompting the secondary SR to move to the standby internal state, if it was not already there). If the SR is a secondary SR, then it will still move to the active state 405 if the primary SR has indicated (e.g., via a diagnostic code message) that its administrative state is inactive or if connectivity is unavailable with the primary SR (this has the possibility of leading to the case in which both of the SRs are in the active state 405). It should be understood that while this description assumes that the SR is part of an active-standby pair, the invention can also be generalized to an active SR with multiple standby SRs.

An SR will transition from the down state 415 directly to the standby state 410 in a slightly different set of conditions. First, as with the transition to the active state 405, the host machine's health must have come back up. If this condition is met, then the SR will transition to the standby state 410 if (i) its administrative state is inactive or (ii) it is the secondary SR and the primary SR has indicated that its administrative state is active (in which case the primary SR will be the in the active state 405). In preemptive mode, an SR with active administrative state will only move to the standby state 410 if it is a secondary SR.

If an SR is in the standby state 410, it will transition to the active state 405 if any of several sets of conditions are met. First, of course, the SR must be in the active administrative state, which is always a requirement for an SR to be in the active state 405. If this is met, the conditions are the same as those for transitioning from the down state 415 to the active state 405. That is, the SR will transition to the active state 405 if (i) it is designated as the primary SR in its logical router cluster, (ii) the administrative state of its peer is inactive, or (iii) BFD connectivity is unavailable with its peer. A primary SR will transition to the active state 405 as soon as its administrative state is changed to active, while a secondary SR will make this transition only if its peer (the primary SR) has had some even that caused it to transition to either the down state 415 (i.e., a host machine health issue) or the standby state 410 (i.e., its administrative state became inactive).

On the other hand, an SR will transition from the active state 405 to the standby state 410 if either (i) its administrative state changes to inactive or (ii) it is the secondary SR and the primary SR has transitioned to the active state 405. The SR's administrative state might change to inactive if the SR is to be migrated, as in the examples above.

Figure 5:
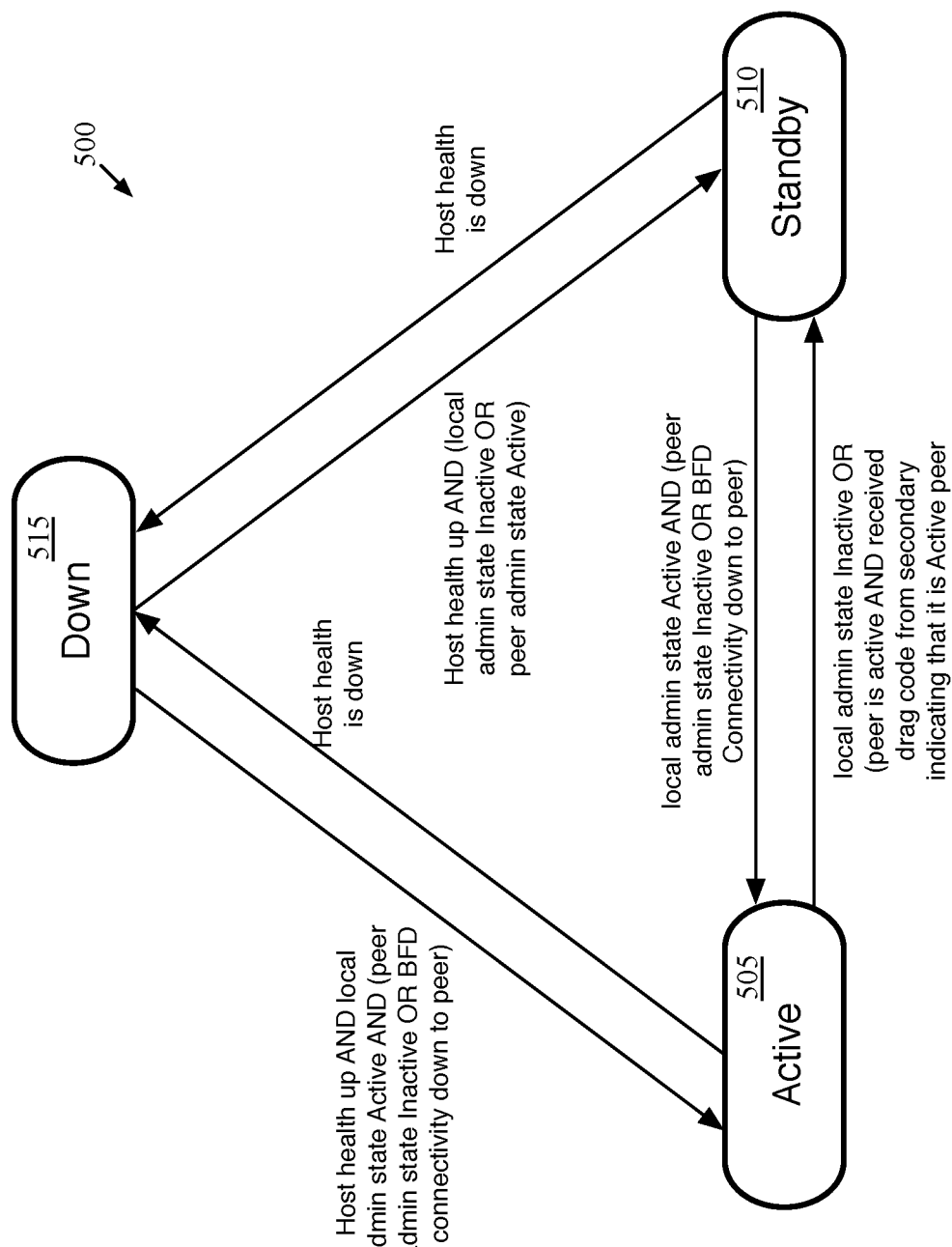
FIG. 5 conceptually illustrates a state machine 500 for an SR in non-preemptive mode.

FIG. 5 conceptually illustrates a state machine 500 for an SR in non-preemptive mode. The non-preemptive mode state machine 500 of some embodiments is similar to the preemptive mode state machine 400, with the same three possible states of active 505, standby 510, and down 515. As with the state machine 400, in different embodiments this may be managed by the local controller on which the SR operates or the SR itself. The primary difference between the preemptive state machine 400 and the non-preemptive state machine 500 relates to when an SR will transition to the active state 505 versus the standby state 510, as in the non-preemptive configuration the active SR will generally stay as such until an event occurs requiring it to transition to the standby state 510 or down state 515.

As in the preemptive mode, an SR will transition to the down state 515 from either the active state 505 or the standby state 510 whenever its host machine's health is down. This could be due to connectivity issues, host maintenance, an inability to communicate with the central controller and/or management plane (and therefore an inability to receive updates), etc.

An SR is less likely to transition from the down state 515 directly to the active state 505 in non-preemptive mode. For this transition to occur, the host machine's health must be back up and its administrative state must be active. If these first two conditions are met, then the SR will transition to the active state 505 if (i) the administrative state of its peer is inactive or (ii) BFD connectivity is unavailable with its peer. That is, the SR only transitions directly to the active state 505 if the other SR in its cluster is not active; in non-preemptive mode, even the primary SR will not preempt the secondary SR if the secondary SR is already in the active state 505.

On the other hand, an SR will usually transition from the down state 515 to the standby state 510 when its host machine health comes back up. Specifically, when the host machine health comes back up, the SR will transition to the standby state 515 if either (i) its administrative state is inactive or (ii) the administrative state of the peer is active. In this latter case, because the peer SR's administrative state was active while the SR was in the down state 515, the SR can assume that its peer is currently in the active state 505 and should not be preempted.

If an SR is in the standby state 510, it will transition to the active state 505 if a specific set of conditions is met. First, its administrative state must be active (as an inactive SR will not transition out of standby). In addition, this transition requires that either the administrative state of the peer has become inactive or BFD connectivity is down to the peer. If the peer becomes inactive, then it will presumably no longer be the active SR and therefore the standby takes over. If BFD connectivity is down to its peer, an SR will assume that the peer is no longer functioning, and will transition to the active state 505. This brings up the possibility of both SRs in an active-standby pair being in the active state 505; once connectivity is regained in some embodiments, the primary will remain in the active state 505, while the secondary transitions to the standby state 510.

An SR will transition to the standby state 505 from the active state 510 if either (i) its administrative state becomes inactive (e.g., in the case of forced failover for migration) or (ii) the SR receives a diagnostic code from the peer indicating that it is the active peer.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
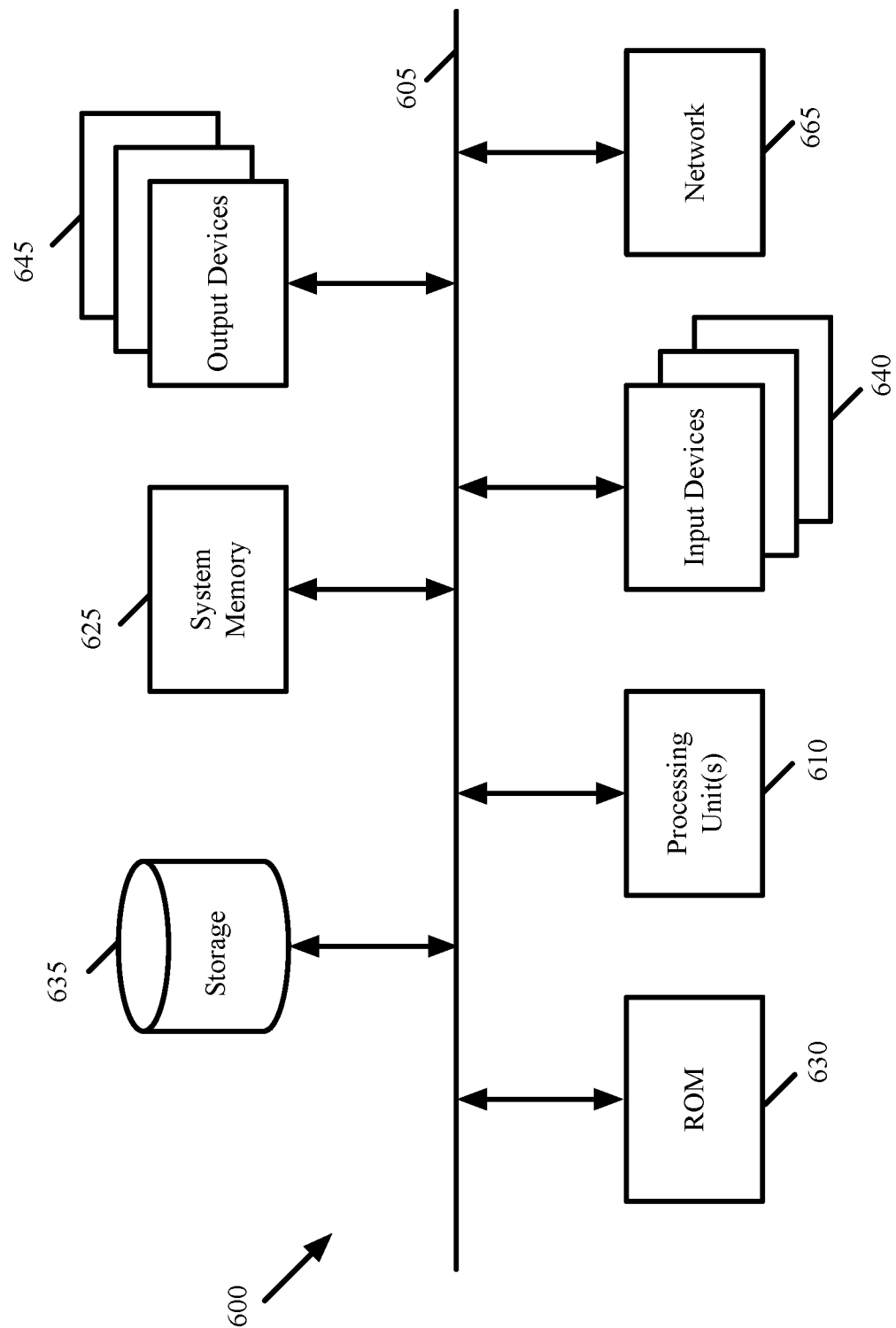
FIG. 6 conceptually illustrates an electronic system with which some embodiments of the invention are implemented.

FIG. 6 conceptually illustrates an electronic system 600 with which some embodiments of the invention are implemented. The electronic system 600 can be used to execute any of the control, virtualization, or operating system applications described above. The electronic system 600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the electronic system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments.

The read-only-memory (ROM) 630 stores static data and instructions that are needed by the processing unit(s) 610 and other modules of the electronic system. The permanent storage device 635, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such a random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the electronic system. The input devices 640 include alphanumeric keyboards and pointing devices (also called "cursor control devices"). The output devices 645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples electronic system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

In addition, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 2 and 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a controller that manages a physical network that implements a plurality of logical networks comprising a plurality of logical routers, a method comprising:

receiving a command to migrate a particular centralized routing component of a logical router from a first host computer on which the particular centralized routing component operates to a second host computer, wherein at least one other centralized routing component of the logical router is implemented on at least one other host computer in the physical network, wherein the particular centralized routing component operates with an administrative state set to active that is shared with the at least one other centralized routing component of the logical router;

identifying the first host computer on which the particular centralized routing component operates, wherein at least one other centralized routing component of another logical router also operates on the identified first host computer; and of the host computers on which centralized routing components operate, directing only the identified first host computer to cause the particular centralized routing component (i) to change to an inactive administrative state in order to facilitate migration of the particular centralized routing component and (ii) to share the change to the inactive administrative state with the at least one other centralized routing component of the logical router, wherein the at least one other centralized routing component of the logical router uses the administrative state of the particular centralized routing component along with administrative states of the at least one other centralized routing component to determine an active centralized routing component for the logical router.

2. The method of claim 1 further comprising directing the second host computer to initiate setup of the particular centralized routing component on the second host computer.

3. The method of claim 1, wherein:

the particular centralized routing component is a first centralized routing component of the logical router and is operating as an active centralized routing component for the logical router prior to receiving directions from the controller; and a second centralized routing component operates as a standby centralized routing component for the logical router on a third host computer prior to the first centralized component receiving directions from the controller.

4. The method of claim 3, wherein each of the centralized routing components comprises an internal state that indicates whether it is an active centralized routing component or a standby centralized routing component, wherein the first centralized routing component, upon changing to an inactive administrative state, automatically changes its internal state to operate as a standby centralized routing component for the logical router rather than as an active centralized routing component.

5. The method of claim 4, wherein the first host computer, sends a message to the third host computer indicating that the first centralized routing component has changed to the inactive administrative state.

6. The method of claim 5, wherein the subsequent behavior of the second centralized routing component depends on whether the centralized routing components for the logical router operate in a preemptive mode or a non-preemptive mode.

7. The method of claim 5, wherein the centralized routing components for the logical router operate in preemptive mode, wherein after the first host computer sends the message to the third host computer:
the second centralized routing component changes its internal state to operate as an active centralized routing component for the logical router rather than as a standby centralized routing component;
the first centralized routing component is migrated to the second host computer;
the first centralized routing component operating on the second host computer automatically changes its internal state to operate as an active centralized routing component;
the second host computer sends a message to the third host computer indicating that the first centralized routing component has changed its internal state to active; and
the second centralized routing component changes its internal state to operate again as a standby centralized routing component in response to the message from the second host computer.

8. The method of claim 7, wherein the first centralized routing component is designated as a primary node of a cluster for the logical router and the second centralized routing component is designated as a secondary node of the cluster.

9. The method of claim 5, wherein the centralized routing components for the logical router operate in non-preemptive mode, wherein after the first host computer sends the message to the third host computer:
the second centralized routing component changes its internal state to operate as an active centralized routing component for the logical router rather than as a standby centralized routing component;
the first centralized routing component is migrated to the second host computer; and
the first centralized routing component automatically operates on the second host computer as a standby centralized routing component.

10. A non-transitory machine readable medium storing a controller program which when executed by at least one processing unit manages a physical network that implements a plurality of logical networks comprising a plurality of logical routers, the program comprising sets of instructions for:
receiving a command to migrate a particular centralized routing component of a logical router from a first host computer on which the particular centralized routing component operates to a second host computer, wherein at least one other centralized routing component of the logical router is implemented on at least one other host computer in the physical network, wherein the particular centralized routing component operates with an administrative state set to active that is shared with the at least one other centralized routing component of the logical router;
identifying the first host computer on which the particular centralized routing component operates, wherein at least one other centralized routing component of another logical router also operates on the identified first host computer; and
of the host computers on which centralized routing components operate, directing only the identified first host computer to cause the particular centralized routing component (i) to change to an inactive administrative state in order to facilitate migration of the particular centralized routing component and (ii) to share the change to the inactive administrative state with the at least one other centralized routing component of the logical router, wherein the at least one other centralized routing component of the logical router uses the administrative state of the particular centralized routing component along with administrative states of the at least one other centralized routing component to determine an active centralized routing component for the logical router.

11. The non-transitory machine readable medium of claim 10, wherein the program further comprises a set of instructions for directing the second host computer to initiate setup of the particular centralized routing component on the second host computer.

12. The non-transitory machine readable medium of claim 10, wherein:
the particular centralized routing component is a first centralized routing component of the logical router and is operating as an active centralized routing component for the logical router prior to receiving directions from the controller; and
a second centralized routing component operates as a standby centralized routing component for the logical router on a third host computer prior to the first centralized component receiving directions from the controller.

13. The non-transitory machine readable medium of claim 12, wherein each of the centralized routing components comprises an internal state that indicates whether it is an active centralized routing component or a standby centralized routing component, wherein the first centralized routing component, upon changing to an inactive administrative state, automatically changes its internal state to operate as a standby centralized routing component for the logical router rather than as an active centralized routing component.

14. The non-transitory machine readable medium of claim 13, wherein the first host computer sends a message to the third host computer indicating that the first centralized routing component has changed to the inactive administrative state.

15. The non-transitory machine readable medium of claim 14, wherein the subsequent behavior of the second centralized routing component depends on whether the centralized routing components for the logical router operate in a preemptive mode or a non-preemptive mode.

16. The non-transitory machine readable medium of claim 14, wherein the centralized routing components for the logical router operate in preemptive mode, wherein after the first host computer sends the message to the third host computer:
the second centralized routing component changes its internal state to operate as an active centralized routing component for the logical router rather than as a standby centralized routing component;

the first centralized routing component is migrated to the second host computer;

the first centralized routing component operating on the second host computer automatically changes its internal state to operate as an active centralized routing component;

the second host computer sends a message to the third host computer indicating that the first centralized routing component has changed its internal state to active; and the second centralized routing component changes its internal state to operate again as a standby centralized routing component in response to the message from the second host computer.

17. The non-transitory machine readable medium of claim 16, wherein the first centralized routing component is designated as a primary node of a cluster for the logical router and the second centralized routing component is designated as a secondary node of the cluster.

18. The non-transitory machine readable medium of claim 14, wherein the centralized routing components for the logical router operate in non-preemptive mode, wherein after the first host computer sends the message to the third host computer:

the second centralized routing component changes its internal state to operate as an active centralized routing component for the logical router rather than as a standby centralized routing component;

the first centralized routing component is migrated to the second host computer; and the first centralized routing component automatically operates on the second host computer as a standby centralized routing component.

19. The non-transitory machine readable medium of claim 14, wherein the first host computer sends the message to the third host computer using a bidirectional forwarding detection (BFD) packet.

20. The method of claim 5, wherein the first host computer sends the message to the third host computer using a bidirectional forwarding detection (BFD) packet.

* * * * *